US011399337B2

(12) United States Patent
Jin (10) Patent No.: US 11,399,337 B2
(45) Date of Patent: Jul. 26, 2022

(54) COMMUNICATION MODE SELECTION METHOD FOR MULTIMODE IOT DEVICE, IOT DEVICE AND STORAGE MEDIUM

(71) Applicant: Telink Semiconductor (Shanghai) Co., Ltd., Shanghai (CN)

(72) Inventor: Haipeng Jin, Shanghai (CN)

(73) Assignee: TELINK SEMICONDUCTOR (SHANGHAI) CO., LTD., Shanghai (CN)

( * ) Notice: Subject to any disclaimer, the term of this patent is extended or adjusted under 35 U.S.C. 154(b) by 142 days.

(21) Appl. No.: 16/754,063

(22) PCT Filed: Jun. 20, 2018

(86) PCT No.: PCT/CN2018/091937
§ 371 (c)(1),
(2) Date: Apr. 6, 2020

(87) PCT Pub. No.: WO2019/085506
PCT Pub. Date: May 9, 2019

(65) Prior Publication Data
US 2020/0329426 A1  Oct. 15, 2020

(30) Foreign Application Priority Data
Oct. 31, 2017  (CN) .......................... 201711044388.5

(51) Int. Cl.
*H04W 4/00* (2018.01)
*H04W 48/18* (2009.01)
(Continued)

(52) U.S. Cl.
CPC .......... *H04W 48/18* (2013.01); *G06F 9/4418* (2013.01); *H04W 4/80* (2018.02); *H04W 76/15* (2018.02);
(Continued)

(58) Field of Classification Search
CPC ....... H04W 48/18; H04W 76/15; H04W 4/80; G06F 9/4418; G07F 9/4401
(Continued)

(56) References Cited

U.S. PATENT DOCUMENTS 9,769,597 B2 * 9/2017 Jin .......................... H04L 25/02
10,050,679 B2 * 8/2018 Riviere .................. H04B 7/028
(Continued)

FOREIGN PATENT DOCUMENTS

CN  102629202 A  8/2012
CN  105610449 A  5/2016
(Continued)

OTHER PUBLICATIONS

Int'l Search Report and Written Opinion dated Sep. 12, 2018 in Int'l Application No. PCT/CN2018/091937, English translation of ISR only.
(Continued)

*Primary Examiner* — Marceau Milord
(74) *Attorney, Agent, or Firm* — Panitch Schwarze Belisario & Nadel LLP (57) ABSTRACT

A communication mode selection method for a multimode IoT device which includes receiving and responding to a trigger operation for selecting a communication mode and causing a multimode IoT device to enter a multimode broadcast state. In the multimode broadcast state, the multimode IoT device sends, to a network device N, network beacons or connection request messages corresponding to the communication modes supported by the multimode IoT device itself. N is an integer greater than or equal to 2. A network connection response message is received from the network device triggering, on the basis of the network connection response message, the multimode IoT device to enter a target communication mode corresponding to the
(Continued)

network connection response message. The IoT device is also capable of selecting a communication mode and a computer storage medium.

9 Claims, 5 Drawing Sheets

(51) Int. Cl.
*H04W 76/15* (2018.01)
*H04W 4/80* (2018.01)
*G06F 9/4401* (2018.01)
*G16Y 10/75* (2020.01)
*H04W 84/18* (2009.01)
*H04W 88/06* (2009.01)

(52) U.S. Cl.
CPC ............. *G16Y 10/75* (2020.01); *H04W 84/18* (2013.01); *H04W 88/06* (2013.01)

(58) Field of Classification Search
USPC ......................................... 370/328, 338, 331
See application file for complete search history.

(56) References Cited

U.S. PATENT DOCUMENTS

| | | | |
|---|---|---|---|
| 10,064,036 B2* | 8/2018 | Kang | H04W 76/14 |
| 2002/0059434 A1* | 5/2002 | Karaoguz | H04W 48/18 |
| | | | 709/228 |
| 2003/0228842 A1* | 12/2003 | Heinonen | H04L 67/04 |
| | | | 455/41.2 |
| 2005/0281237 A1* | 12/2005 | Heinonen | H04L 29/06 |
| | | | 370/338 |
| 2010/0019920 A1* | 1/2010 | Ketari | H04W 12/04 |
| | | | 340/686.6 |
| 2014/0323048 A1* | 10/2014 | Kang | H04W 76/14 |
| | | | 455/41.2 |
| 2015/0006296 A1* | 1/2015 | Gupta | G06Q 30/0269 |
| | | | 705/14.66 |
| 2016/0080896 A1* | 3/2016 | Song | H04L 65/607 |
| | | | 455/41.2 |
| 2016/0241999 A1* | 8/2016 | Chin | G08C 23/04 |
| 2016/0371074 A1 | 12/2016 | Vyas et al. | |
| 2017/0108235 A1* | 4/2017 | Guan | F24F 11/30 |
| 2017/0278291 A1* | 9/2017 | Young | G06F 8/38 |
| 2018/0270188 A1* | 9/2018 | Kodaypak | H04L 63/0428 |
| 2020/0344084 A1* | 10/2020 | Shribman | H04L 69/16 |

FOREIGN PATENT DOCUMENTS

| | | |
|---|---|---|
| CN | 106790652 A | 5/2017 |
| CN | 107135010 A | 9/2017 |
| CN | 107846672 A | 3/2018 |
| EP | 3026979 A1 | 6/2016 |
| WO | 2015109279 A1 | 7/2015 |

OTHER PUBLICATIONS

Extended European Search Report dated Jul. 9, 2021 in European Application No. 18872522.0.

* cited by examiner

COMMUNICATION MODE SELECTION METHOD FOR MULTIMODE IOT DEVICE, IOT DEVICE AND STORAGE MEDIUM

CROSS-REFERENCE TO RELATED APPLICATIONS

This application is a Section 371 of International Application No. PCT/CN2018/091937, filed Jun. 20, 2018, which was published in the Chinese language on May 9, 2019, under International Publication No. WO 2019/085506 A1, which claims priority under 35 U.S.C. § 119(b) to Chinese Application No. 201711044388.5, filed Oct. 31, 2017, the disclosures of each of which are incorporated herein by reference.

TECHNICAL FIELD

The present disclosure relate to network access technologies of an Internet of Things (IoT) device, and in particular, to a communication mode selection method for a multimode IoT device, an IoT device and a computer storage medium.

BACKGROUND

At present, there exist a plurality of communication standards or communication modes applicable to 2.4 GHz IoT, for example, Bluetooth Low Energy (BLE), Bluetooth Low Energy Mesh (self-organizing network Bluetooth), Zigbee (Zigbee protocol), Thread and 6LoWPAN, with overlapped or crossed coverages in application fields of home environment, office environment and industrial environment, etc.

The existing IoT device mainly includes the following two types: 1) an IoT device that works only in a single-mode state, that is, supports only one communication mode; 2) a multimode IoT device that works in a multimode-switchable state and supports a plurality of communication modes.

However, in the existing multimode IoT device, a plurality of communication modes are supported on one and the same firmware, such that switching among said plurality of communication modes are enabled while the firmware is running. For example, Chinese Patent Application Publication CN105610449A discloses a dual-mode RF transceiver architecture, wherein a firmware loaded on one and the same hardware chip supports two RF transceiving modes, and switching between the two RF transceiving modes is possible while the firmware is running. However, this architecture may cause chip resources to be shared between the two RF transceiving modes, which tends to cause network delay in each RF transceiving mode, thereby resulting in poor user experience. Therefore, it is desired to enable, in the case that an IoT device supports a plurality of communication modes, the hardware chip resources to be fully used individually in each communication mode, the utilization ratio of the hardware chip resources to be improved in each communication mode, the network delay due to hardware resource limitation of the IoT device to be reduced, and user experience of the IoT device to be improved.

SUMMARY

The present disclosure can improve the hardware resource utilization ratio of an IoT device in each communication mode supported by the IoT device and effectively lower the network delay due to hardware resource limitation of the IoT device, thereby improving the user experience of the IoT device.

According to a first aspect of this disclosure, there provides a communication mode selection method for a multimode IoT device. The method includes: entering, by the multimode IoT device, a multimode advertising state in response to receiving a trigger operation for communication mode selection; sending, by the multimode IoT device in the multimode advertising state, to a network device N network beacon or connection request messages corresponding to communication modes supported by the multimode IoT device, wherein N is an integer greater than or equal to 2; receiving a network connection response message from the network device; and entering, by the multimode IoT device based on the network connection response message, a target communication mode corresponding to the network connection response message.

According to one embodiment of this disclosure, the trigger operation includes: a trigger operation causing the multimode IoT device to be powered on for the first time after leaving factory; or, a trigger operation causing the multimode IoT device to be powered on for the first time after being reset; or, a trigger operation causing the multimode IoT device to be connected with the network device for the first time; or, a trigger operation causing the multimode IoT device to be connected with the network device for the first time after being reset.

According to one embodiment of this disclosure, the communication modes supported by the multimode IoT device include a combination of at least two of: BLE or BLE Mesh, Zigbee, Thread, HomeKit, ANT and a private communicate protocol; correspondingly, the N network beacon or connection request messages corresponding to the communication modes supported by the multimode IoT device include a combination of at least two of: a BLE advertising message, a Zigbee Beacon request message, a Thread Beacon request message or an MLE discovery request message, and a private beacon.

According to one embodiment of this disclosure, sending N network beacon or connection request messages corresponding to the communication modes supported by the multimode IoT device includes: sending the N network beacon or connection request messages corresponding to the communication modes supported by the multimode IoT device sequentially in time via different frequency sets respectively; or, sending at least two of the N network beacon or connection request messages corresponding to the communication modes supported by the multimode IoT device alternately in time via a shared same frequency set.

According to one embodiment of this disclosure, entering, by the multimode IoT device, a target communication mode corresponding to the network connection response message includes: triggering a firmware corresponding to the target communication mode among a plurality of firmwares of the multimode IoT device to enter an activated state.

According to a second aspect of this disclosure, there provides a multimode IoT device capable of communication mode selection. The device includes: a first receiving means, configured to receive a trigger operation for communication mode selection to cause the multimode IoT device to enter a multimode advertising state in response to the trigger operation; a sending means, configured to send, in the multimode advertising state, to a network device N network beacon or connection request messages corresponding to communication modes supported by the multimode IoT device, wherein N is an integer greater than or equal to 2; a second receiving means, configured to receive a network connection response message from the network device; and an executing means, configured to trigger, based on the network connection response message, the multimode IoT device to enter a target communication mode corresponding to the network connection response message.

According to one embodiment of this disclosure, the sending means is configured to: send the N network beacon or connection request messages corresponding to the communication modes supported by the multimode IoT device sequentially in time via different frequency sets respectively; or, send at least two of the N network beacon or connection request messages corresponding to the communication modes supported by the multimode IoT device alternately in time via a shared same frequency set.

According to one embodiment of this disclosure, the executing means is configured to trigger a firmware corresponding to the target communication mode among a plurality of firmwares of the multimode IoT device to enter an activated state.

According to a third aspect of this disclosure, there provides a multimode IoT device capable of communication mode selection, which includes: one or more processors; a storage; a computer program stored on the storage, wherein, when executed by the one or more processors, the computer program can cause the one or more processors to implement the communication mode selection method for a multimode IoT device according to the above first aspect.

According to a fourth aspect of this disclosure, there provides a computer-readable storage medium, on which a computer program is stored, wherein, when executed by a processor, the computer program can cause the processor to implement the method according to the above first aspect.

In the light of this disclosure, a multimode IoT device can adaptively determine the communication mode under different access network environments, and the wireless network connection with a network device can be achieved by activating a firmware corresponding to its specific network environment, thus network delay caused by chip hardware resource limitation of the IoT device can be effectively lowered, thereby improving the user experience of the IoT device.

It should be understood that, the teaching of this disclosure does not need to realize all the above beneficial effects, instead, a specific technical solution may realize a specific technical effect, and other embodiments of this disclosure can further realize some beneficial effects not mentioned above.

BRIEF DESCRIPTION OF THE DRAWINGS

The above and other objects, characteristics and advantages of exemplary embodiments of the disclosure will be easy to be understood by reading the detailed description below with reference to the drawings. In the drawings, several embodiments of the disclosure are shown exemplarily, rather than limitatively, wherein.

In the drawings, the same or the corresponding reference sign represents the same or the corresponding part.

DETAILED DESCRIPTION

The principles and concepts of the disclosure will be described below by referring to several exemplary embodiments. It should be understood that, these embodiments are only provided for one skilled in the art to better understand and thus implement the disclosure, rather than to limit the scope of the disclosure in any way. On the contrary, these embodiments are provided to make this disclosure more thorough and more complete and to more fully convey the scope of this disclosure to those skilled in the art.

Specific embodiments of the disclosure will be described in detail below in conjunction with the drawings.

Figure 1:
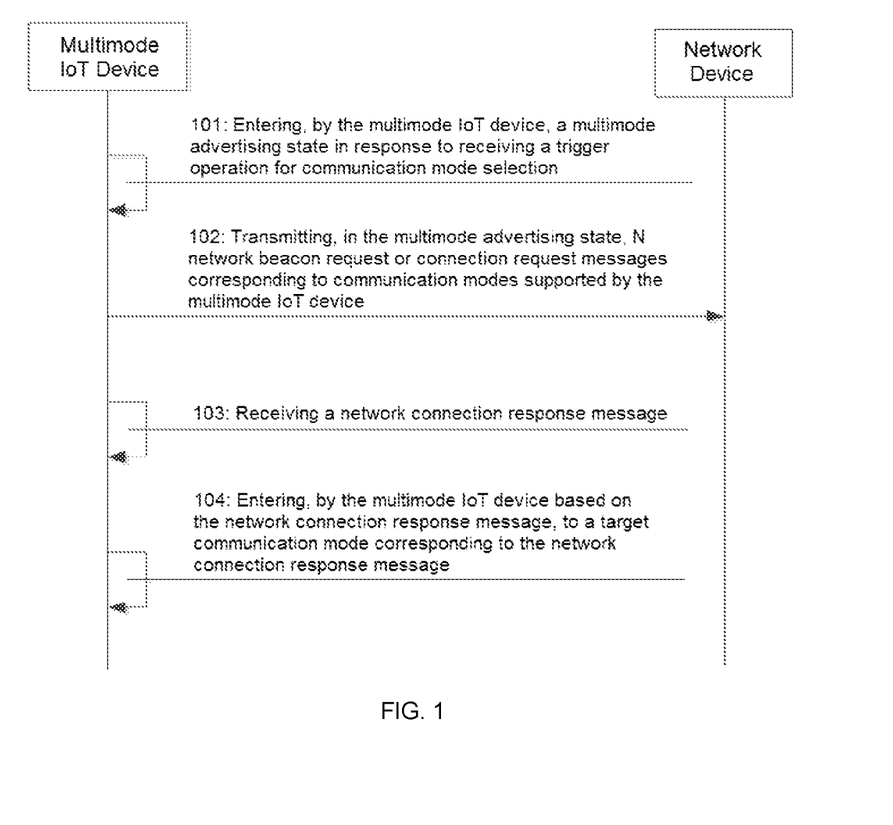
FIG. 1 is a schematic flowchart of a communication mode selection method for a multimode IoT device according to an embodiment of the disclosure.

FIG. 1 is a schematic flowchart of a communication mode selection method for a multimode IoT device according to an embodiment of the disclosure.

As shown in FIG. 1, one embodiment of the disclosure provides a communication mode selection method for a multimode IoT device, which includes the operations below: in Operation 101, in response to receiving a trigger operation for communication mode selection, a multimode IoT device enters a multimode advertising state; in Operation 102, in the multimode advertising state, the multimode IoT device sends N network beacon or connection request messages corresponding to communication modes supported by the multimode IoT device to a network device, wherein N is an integer greater than or equal to 2, and N may be the number of the communication modes supported by the multimode IoT device; in Operation 103, a network connection response message is received from the network device; and in Operation 104, based on the network connection response message, the multimode IoT device enters a target communication mode corresponding to the network connection response message.

In Operation 101, the trigger operation for communication mode selection may include the following several types:

Type 1: a trigger operation causing the multimode IoT device to be powered on for the first time after leaving factory;

For example, a multimode IoT device is powered on for the first time after leaving factory and being carried to an application field such as home environment, office environment or industrial environment, etc., whereby the SoC chip (system chip) of the multimode IoT device is in a startup state so as to make the multimode IoT device enter a multimode advertising state, so that the multimode IoT device attempts to perform wireless communication connection with a network device located in its own wireless advertising coverage.

Type 2: a trigger operation causing the multimode IoT device to be powered on for the first time after being reset For example, a multimode IoT device is powered on for the first time after factory settings recovery is triggered by a user, whereby the SoC chip (system chip) of the multimode IoT device is in a restart state so as to make the multimode IoT device enter a multimode advertising state, so that the multimode IoT device attempts to perform wireless communication connection with a network device located in its own wireless advertising coverage.

Type 3: a trigger operation causing a multimode IoT device to be connected with a network device for the first time For example, when a user shuts down a Zigbee gateway that has been connected with the multimode IoT device currently and starts up the Bluetooth function of an intelligent mobile phone, the multimode IoT device automatically detects that it is currently in a state of no network connection or the wireless communication connection with the Zigbee gateway is interrupted, thus it enters the multimode advertising state via self-triggering, so that it attempts to perform wireless communication connection with a network device located in its own wireless advertising coverage (for example, an intelligent mobile phone initiating a Bluetooth function).

Type 4: a trigger operation causing a multimode IoT device to be connected with a network device for the first time after being reset For example, when the multimode IoT device is carried to an application field such as home environment, office environment or industrial environment, etc., for the first time after factory settings recovery is triggered by a user, the multimode IoT device automatically detects that it is currently in a state of no network connection, thus it enters the multimode advertising state via self-triggering, so that it attempts to perform wireless communication connection with a network device in its own wireless advertising coverage.

In certain embodiments, the multimode IoT device includes an LED bulb or various sensing elements. The network device includes a device capable of acting as a wireless gateway, such as a set-top box, a router, an intelligent mobile phone, a PC machine or a tablet computer, etc.

In Operation 102, the multimode IoT device transmits N network beacon or connection request messages corresponding to the communication modes supported by the multimode IoT device itself sequentially in time via different frequency sets respectively; or, transmits at least two of N network beacon or connection request messages corresponding to the communication modes supported by the multimode IoT device itself alternately in time via a shared same frequency set.

In certain embodiments, the communication modes supported by the multimode IoT device itself includes a combination of at least two of: BLE or BLE Mesh, Zigbee, Thread, HomeKit, ANT and a private communicate protocol; correspondingly, the N network beacon or connection request messages corresponding to the communication modes supported by the multimode IoT device itself include a combination of at least two of: a BLE advertising message, a Zigbee Beacon request message, a Thread Beacon request message or an MLE discovery request message, and a private beacon.

In one example, the multimode IoT device transmits three network connection request messages corresponding to three communication standards, i.e., BLE, Zigbee and Thread, supported by the multimode IoT device itself in a Time Division Multiplexing (TDM) transmission mode.

Figure 2:
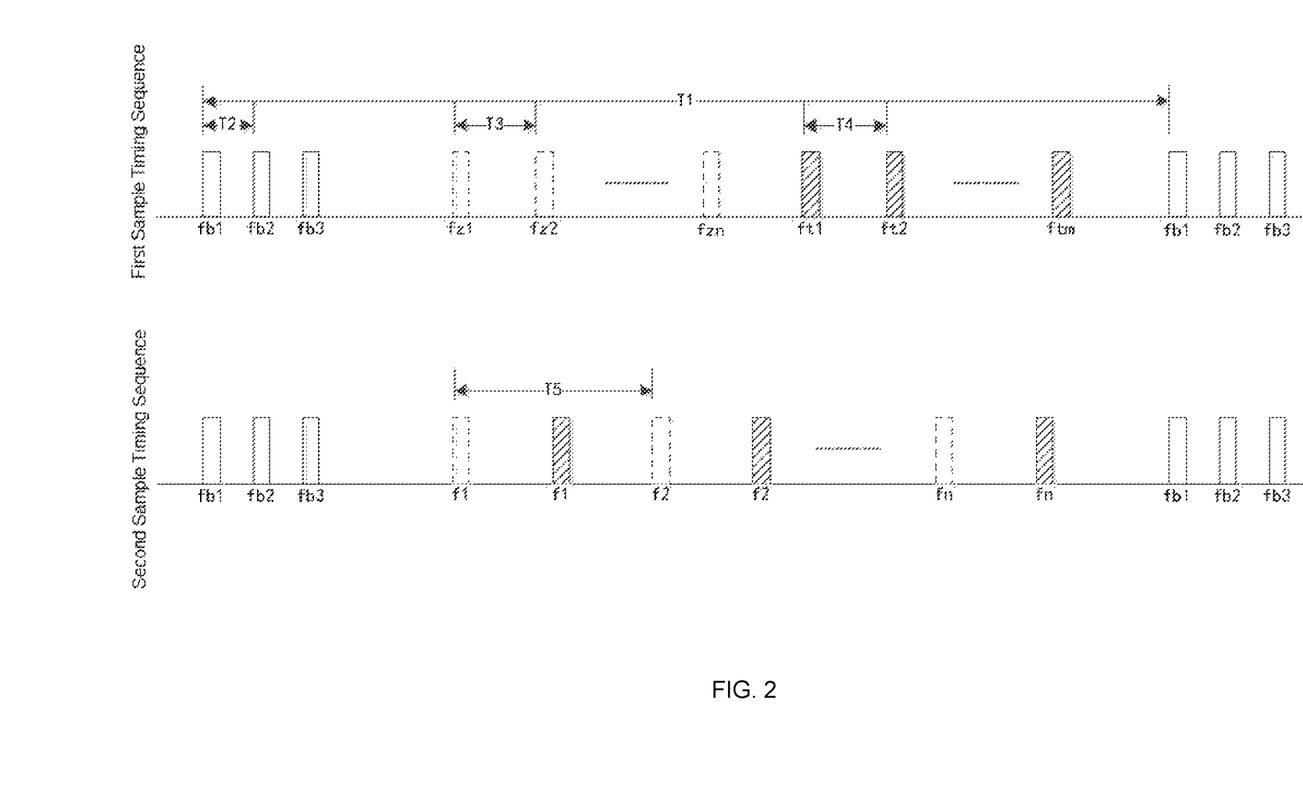
FIG. 2 is a transmission timing diagram of a multimode IoT device in a multimode advertising state according to an embodiment of the disclosure.

FIG. 2 is a transmission timing diagram of a multimode IoT device in a multimode advertising state according to an embodiment of the disclosure.

As shown in FIG. 2, in a first sample timing sequence, the multimode IoT device transmits in one T1 period the following data packets and performs listening:

1) a BLE advertising data packet transmitted on a set of 3 BLE advertising channel, i.e., fb1, fb2 and fb3 with an interval of T2, as shown by the solid rectangle pulse in FIG. 2;

2) a Zigbee Beacon request message transmitted on a set of n 802.15.4 RF channels, i.e., fz1, fz2, . . . , fzn, with an interval of T3, as shown by the dotted rectangle pulse in FIG. 2; and 3) a Thread Beacon request message or an MLE discovery request message transmitted on a set of m 802.15.4 RF channels, i.e., ft1, ft2, . . . , ftm, with an interval of T4, as shown by the slash-filled rectangle pulse in FIG. 2.

In a second sample timing sequence different from the above first sample timing sequence, a Zigbee Beacon request message corresponding to the communication mode Zigbee and a Thread Beacon request message or an MLE discovery request message corresponding to the communication mode Thread share the same set of channels, and an alternate (i.e., staggered) transmission of a Zigbee Beacon request message and a Thread Beacon request message or an MLE discovery request message may be carried out on a set of n 802.15.4 RF channel, i.e., f1, f2, . . . , fn, with an interval of T5, that is, a Zigbee Beacon request message and a Thread Beacon request message or an MLE discovery request message are alternately transmitted on the same frequency channel f1 in one and the same time interval T5; then by switching to the next frequency channel f2, a Zigbee Beacon request message and a Thread Beacon request message or an MLE discovery request message are alternately transmitted on the same frequency channel f2 in one and the same time interval T5; and so on, till a Zigbee Beacon request message and a Thread Beacon request message or an MLE discovery request message are alternately transmitted on the same frequency channel fn in one and the same time interval T5.

In Operation 103, within the wireless advertising coverage of the multimode IoT device, the network device can receive a network beacon or connection request message matching its own communication mode from the multimode IoT device; then, the network device will feed back the network connection response message carrying its own network configuration information to the multimode IoT device.

In certain embodiments, the network configuration information may include, for example, network type information, packet information and its encryption information, etc.

In Operation 104, since the multimode IoT device according to the embodiment of the disclosure includes a plurality of firmwares supporting different communication modes respectively, the multimode IoT device may trigger a firmware corresponding to the target communication mode among its own plurality of firmwares to enter an activated state. In this case, the rest firmwares not activated will not occupy the hardware running resource of the multimode IoT device.

Figure 3:
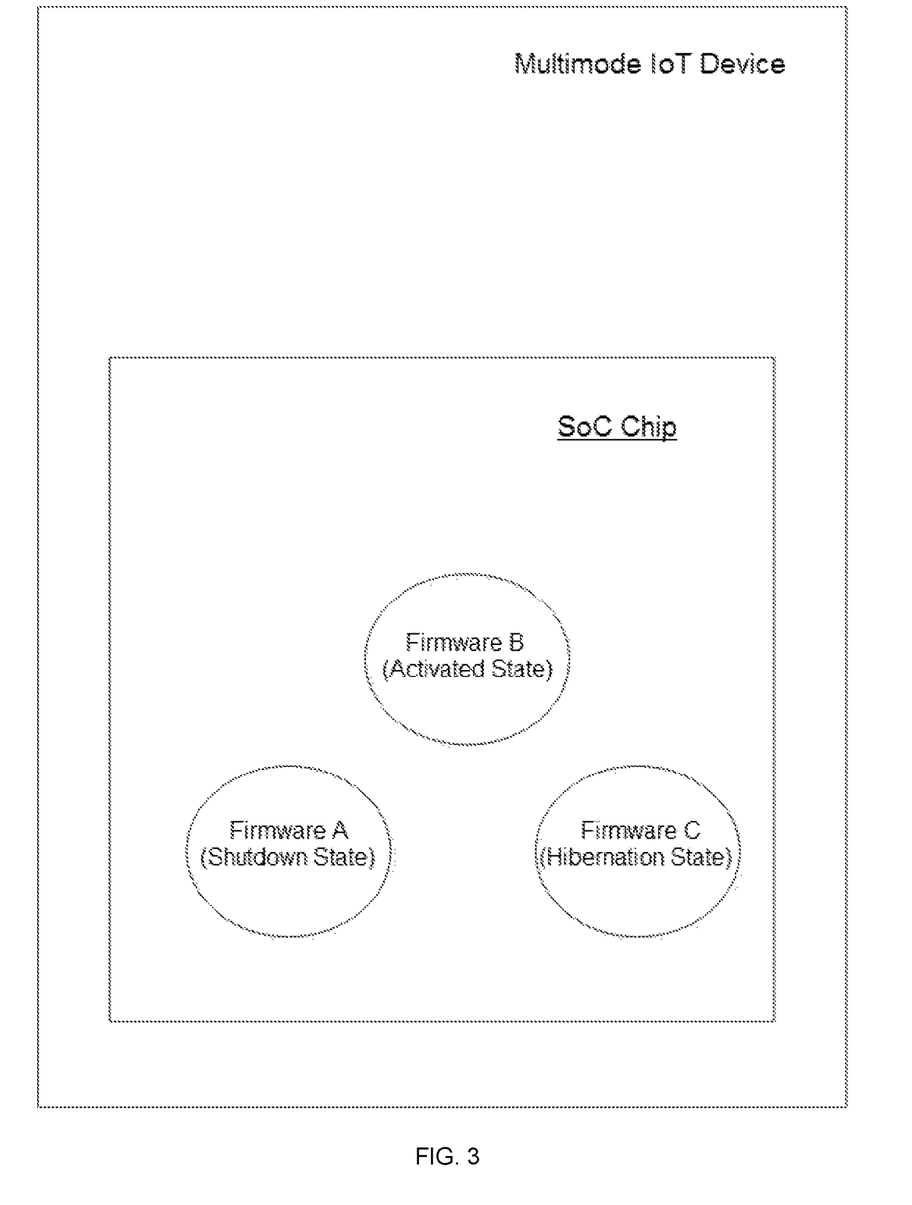
FIG. 3 is a diagram showing statuses of a plurality of firmwares in a multimode IoT device according to an embodiment of the disclosure.

FIG. 3 is a diagram showing statuses of a plurality of firmwares in a multimode IoT device according to an embodiment of the disclosure.

In one example, as shown in FIG. 3, it is assumed that the multimode IoT device includes a firmware A, a firmware B and firmware C that respectively support BLE, Zigbee and Thread. When the network connection response message fed back by the network device belongs to a Zigbee wireless network, the multimode IoT device automatically triggers its corresponding firmware B to enter an activated state. Apparently, at this time, other firmwares would all be in a hibernation state or a shutdown state.

In such a way, the multimode IoT device can achieve the wireless network connection with a network device via a firmware corresponding to its specific network environment under different access network environments, and network delay caused by the limited hardware running resources of the multimode IoT device can be effectively lowered, thereby user experience of the multimode IoT device may be improved.

Figure 4:
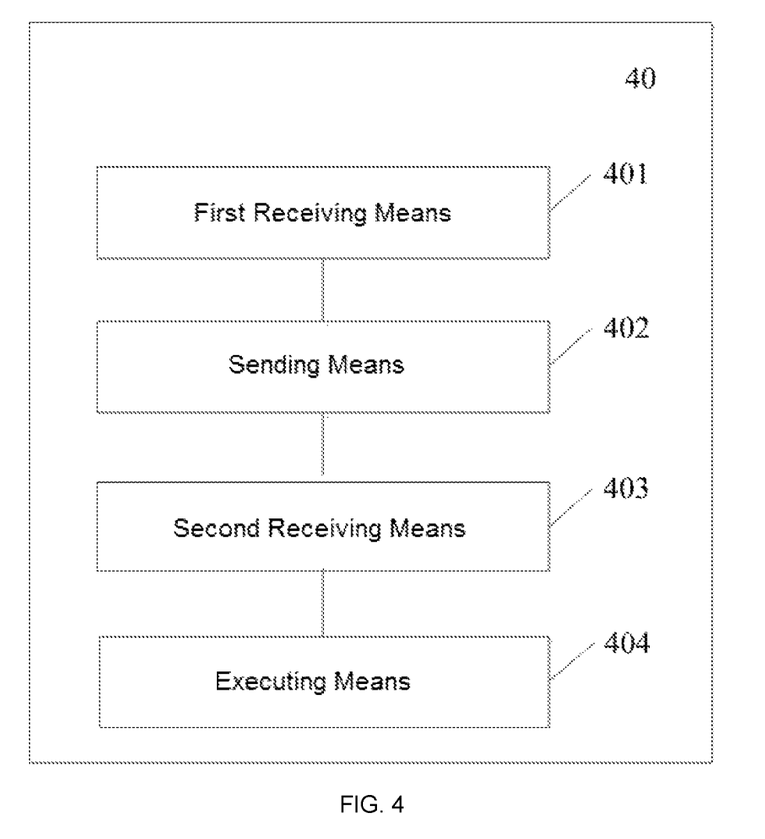
FIG. 4 is a schematic diagram showing the construction of a multimode IoT device capable of communication mode selection according to an embodiment of the disclosure.

FIG. 4 is a schematic diagram showing the construction of a multimode IoT device capable of communication mode selection according to an embodiment of the disclosure.

As shown in FIG. 4, one embodiment of the disclosure provides a multimode IoT device 40 capable of communication mode selection. The device 40 includes: a first receiving means 401, configured to receive a trigger operation for communication mode selection to cause the multimode IoT device to enter a multimode advertising state in response to the trigger operation; a sending means 402, configured to send, in the multimode advertising state, N network beacon or connection request messages corresponding to communication modes supported by the multimode IoT device to a network device, wherein N is an integer greater than or equal to 2, for example, N may be the number of the communication modes supported by the multimode IoT device; a second receiving means 403, configured to receive a network connection response message from the network device; and an executing means 404, configured to trigger the multimode IoT device to enter a target communication mode corresponding to the network connection response message based on the network connection response message.

According to one embodiment of this disclosure, the trigger operation includes: a trigger operation causing the multimode IoT device to be powered on for the first time after leaving factory; or, a trigger operation causing the multimode IoT device to be powered on for the first time after being reset; or, a trigger operation causing a multimode IoT device to be connected with a network device for the first time; or, a trigger operation causing a multimode IoT device to be connected with a network device for the first time after being reset.

According to one embodiment of this disclosure, the communication mode supported by the multimode IoT device itself includes a combination of at least two of: BLE or BLE Mesh, Zigbee, Thread, HomeKit, ANT and a private communicate protocol; correspondingly, N network beacon or connection request messages corresponding to the communication modes supported by the multimode IoT device itself include a combination of at least two of: a BLE advertising message, a Zigbee Beacon request message, a Thread Beacon request message or an MLE discovery request message, and a private beacon.

According to one embodiment of this disclosure, the sending means 402 is specifically configured to send N network beacon or connection request messages corresponding to the communication modes supported by the multimode IoT device itself sequentially in time via different frequency sets respectively, or send at least two of N network beacon or connection request messages corresponding to the communication modes supported by the multimode IoT device itself alternately in time via a shared same frequency set.

According to one embodiment of this disclosure, the executing means 404 is specifically configured to trigger a firmware corresponding to a target communication mode among the plurality of firmwares of the multimode IoT device to enter an activated state.

For example, in the example below, the multimode IoT device may be a commercially available multimode IoT bulb, which supports three communication modes of BLE, Zigbee and Thread. Moreover, a Zigbee gateway is mounted in the user's house. When the user takes the purchased multimode IoT bulb home and inserts it into a power socket, the multimode IoT bulb enters the multimode advertising state and starts to send a BLE advertising message, a Zigbee Beacon request message and a Thread MLE discovery request message. After the Zigbee gateway receives a Zigbee Beacon request message, in responds to which it provides a Zigbee Beacon to the multimode IoT bulb, so that the multimode IoT bulb enters the Zigbee communication mode, thereby joining the home network of the user to start to work.

Here, it should be noted that: the description of the above device embodiment is similar to that of the above method embodiment, and the same beneficial effects as the method embodiment can be obtained, thus no repeated description will be given again here. For the technical details not disclosed in the device embodiment of the disclosure, reference may be made to the description of the method embodiment of the disclosure.

Exemplary Device

The method and device according to one exemplary embodiment of the disclosure have been introduced above, and next, a multimode IoT device capable of communication mode selection according to another exemplary embodiment of the disclosure will be introduced.

It may be understood by one skilled in the art that, each aspect of the disclosure may be implemented as a system, a method or a program product. Therefore, each aspect of the disclosure may be specifically implemented in the following forms, i.e., full hardware embodiment, full software embodiment (including firmware and microcode, etc.) or an embodiment combining hardware and software aspects, which herewith may be called by the general term of "circuit", "module" or "system".

In some possible embodiments, the multimode IoT device capable of communication mode selection according to the disclosure may at least include one or more processors and at least one storage, wherein a computer program is stored on the storage, and when executed by a processor, the computer program can cause the processor to implement each step of the communication mode selection method for a multimode IoT device described in the disclosure, for example, the processor may perform the operations as shown in FIG. 1: in Operation 101, receiving a trigger operation for communication mode selection to cause to the multimode IoT device to enter a multimode advertising state in response to the trigger operation; in Operation 102, in the multimode advertising state, causing the multimode IoT device to send N network beacon or connection request messages corresponding to communication modes supported by the multimode IoT device itself to a network device, wherein N is an integer greater than or equal to 2; in Operation 103, receiving a network connection response message from the network device; and in Operation 104, based on the network connection response message, triggering the multimode IoT device to enter the target communication mode corresponding to the network connection response message.

Figure 5:
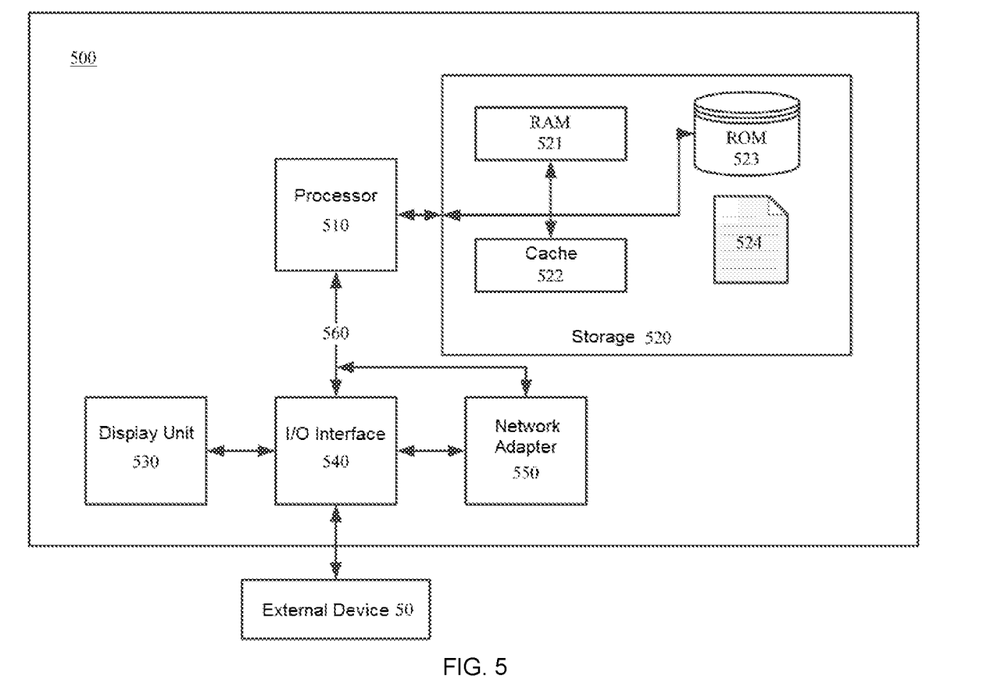
FIG. 5 is a schematic diagram showing the implementation of a multimode IoT device capable of communication mode selection according to an embodiment of the disclosure.

FIG. 5 is a schematic diagram showing the implementation of a multimode IoT device capable of communication mode selection according to an embodiment of the disclosure.

A multimode IoT device 500 capable of communication mode selection according to such an embodiment of the disclosure will be described below referring to FIG. 5. The device 500 shown in FIG. 5 is merely an example, without limiting the functions and range of use of the embodiments of the disclosure in any way.

As shown in FIG. 5, the device 500 is shown in the form of a general-purpose computing device, including, but not limited to: at least one processor 510 described above, at least one storage 520 described above, and a bus 560 connecting different system components (including the storage 520 and the processor 510).

The bus 560 includes an address bus, a control bus and a data bus.

The storage 520 may include a volatile storage, for example, a random access memory (RAM) 521 and/or a cache memory 522. The storage 520 may further include a read-only memory (ROM) 523.

The storage 520 may further include a group of (at least one) program module 524, and such a program module 524 includes, but is not limited to: an operating system, one or more application programs, other program modules and program data. Each or a certain combination of such examples may include the implementation of a network environment.

The device 500 may further communicate with one or more external devices 50 (for example, a keyboard, a pointing device and a Bluetooth device, etc.). Such communication may be carried out via an input/output (I/O) interface 540 and displayed on a display unit 530. Moreover, the device 500 may further communicate with one or more networks (for example, a local area network (LAN), a wide area network (WAN) and/or a public network such as Internet) via a network adapter 550. As shown in the drawing, the network adapter 550 communicates with other modules in the device 500 via the bus 560. It should be noted that, although not shown in the drawings, other hardware and/or software modules may be used in conjunction with the device 500, including, but not limited to: a microcode, a device driver, a redundant processing unit, an external disk drive array, a RAID system, a magnetic tape drive and a data backup and storage system, etc.

Exemplary Computer Program Product

In some possible embodiments, each aspect of the disclosure may be further implemented in the form of a computer program product, which includes a program code, wherein, when executed by a processor, the program code may be configured to cause the processor to implement each step of the above described method. For example, the processor may perform the operations shown in FIG. 1: in Operation 101, receiving a trigger operation for communication mode selection to cause the multimode IoT device to enter a multimode advertising state in response to the trigger operation; in Operation 102, causing, in the multimode advertising state, the multimode IoT device to send N network beacon or connection request messages corresponding to the communication modes supported by the multimode IoT device itself to a network device, wherein N is an integer greater than or equal to 2; in Operation 103, receiving a network connection response message from the network device; and in Operation 104, based on the network connection response message, triggering the multimode IoT device to enter the target communication mode corresponding to the network connection response message.

The computer program product may employ any combination of one or more readable media. The readable medium may be a readable signal medium or a readable storage medium. For example, the readable storage medium may be, but not limited to, an electrical, magnetic, optical, electromagnetic, infrared or semiconductor system, apparatus or device, or any combination of the above. A more specific example of the readable storage medium (non-exhaustive list) includes: an electrical connection with one or more wires, a portable disk, a hard disk, a random access memory (RAM), a read-only memory (ROM), an erasable programmable read-only memory (EPROM or Flash), an optical fiber, a compact disk-read only memory (CD-ROM), an optical storage device, a magnetic storage device or any appropriate combination of above.

Figure 6:
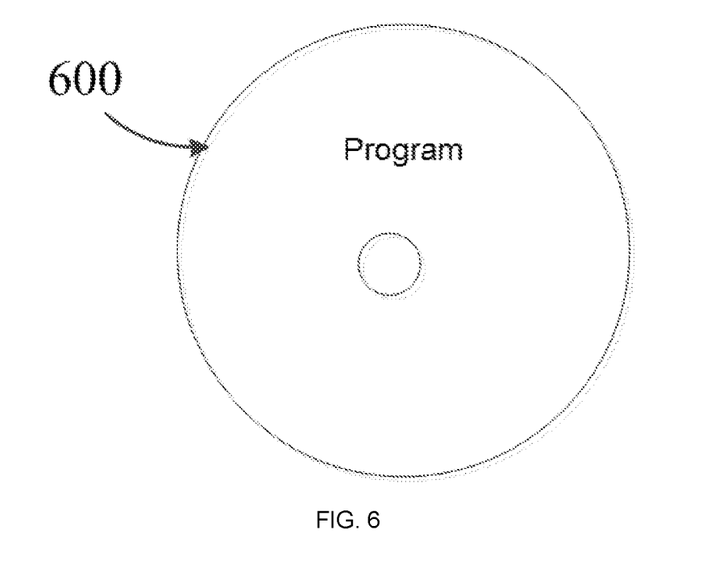
FIG. 6 is a schematic diagram of a computer-readable storage medium on which a computer program that can implement the communication mode selection method for a multimode IoT device according to an embodiment of the disclosure is stored.

FIG. 6 is a schematic diagram of a computer-readable storage medium on which a computer program that can implement the communication mode selection method for a multimode IoT device according to an embodiment of the disclosure is stored.

As shown in FIG. 6, a program product 600 according to one embodiment of the disclosure is described, which may employ a compact disk-read only memory (CD-ROM) and include a program code, and may be run on a terminal or a server. However, the program product of the disclosure is not limited hereto. In this document, the readable storage medium may any tangible medium on which a program is contained or stored, wherein the program may be executed by an instruction, or used by a system, an apparatus or a device, or used in conjunction therewith.

The program code for carrying out the operations of the disclosure may be written in any combination of one or more program design languages. The program design language includes an object-oriented program design language such as Java and C++, etc., and it may further include a regular procedural program design language such as C language or similar program design languages. The program code may be fully executed on a user computing device, partially executed on a user device, partially executed on a user computing device, or fully executed on a remote computing device or a server. In a situation concerning a remote computing device, the remote computing device may be connected to the user computing device via any type of networks (including a local area network (LAN) or a wide area network (WAN)), or may be connected to an external computing device (for example, via Internet connection provided by an Internet service provider).

In addition, although the operations of the method of the disclosure have been described in a certain sequence in the drawings, it does not require or indicate that these operations must be carried out in this specific sequence, or the expected result can only be realized by carrying out all the operations shown. Additionally or alternatively, certain steps may be omitted, and a plurality of steps may be combined into one step, and/or one step may be decomposed into a plurality of steps.

It should be noted that, although several apparatuses and subapparatuses configured for software testing are mentioned in the above detailed description, such a partition is not compulsory. In fact, according to the embodiments of the disclosure, the characteristics and functions of two or more apparatuses described above may be embodied in one apparatus. On the contrary, the characteristic and function of one apparatus described above may be further partitioned as being embodied by a plurality of apparatuses.

Although the concepts and principles of the disclosure have been described referring to several specific embodiments, it should be understood that the disclosure is not limited to the specific embodiments disclosed, and the partition of each aspect does not indicate that the characteristics in such aspects cannot be combined for further benefits; instead, such a partition is merely provided for easy illustration. The disclosure intends to cover various modifications and equivalent arrangements included in the spirit and scope of the claims.

What is claimed is:

1. A communication mode selection method for a multimode IoT device, comprising:
    entering, by the multimode IoT device, a multimode advertising state in response to receiving a trigger operation for communication mode selection;
    sending, by the multimode IoT device in the multimode advertising state, to a network device N network beacon or connection request messages corresponding to communication modes supported by the multimode IoT device, wherein N is an integer greater than or equal to 2;
    receiving a network connection response message from the network device; and
    entering, by the multimode IoT device based on the network connection response message, a target communication mode corresponding to the network connection response message,
    wherein sending N network beacon or connection request messages corresponding to the communication modes supported by the multimode IoT device comprises:
    sending the N network beacon or connection request messages corresponding to the communication modes supported by the multimode IoT device sequentially in time via different frequency sets respectively; or
    sending at least two of the N network beacon or connection request messages corresponding to the communication modes supported by the multimode IoT device alternately in time via a shared same frequency set.

2. The communication mode selection method according to claim 1, wherein the trigger operation comprises:
    a trigger operation causing the multimode IoT device to be powered on for the first time after leaving factory; or
    a trigger operation causing the multimode IoT device to be powered on for the first time after being reset; or
    a trigger operation causing the multimode IoT device to be connected with the network device for the first time; or
    a trigger operation causing the multimode IoT device to be connected with the network device for the first time after being reset.

3. The communication mode selection method according to claim 1, wherein:
    the communication modes supported by the multimode IoT device comprise a combination of at least two of: Bluetooth Low Energy (BLE) or BLE Mesh, Zigbee, Thread, HomeKit, ANT and a private communicate protocol; and
    the N network beacon or connection request messages corresponding to the communication modes supported by the multimode IoT device comprise a combination of at least two of: a Bluetooth Low Energy advertising message, a Zigbee Beacon request message, a Thread Beacon request message or an MLE discovery request message, and a private beacon.

4. The communication mode selection method according to claim 1, wherein entering, by the multimode IoT device, a target communication mode corresponding to the network connection response message comprises:
    triggering a firmware corresponding to the target communication mode among a plurality of firmwares of the multimode IoT device to enter an activated state.

5. A multimode IoT device capable of communication mode selection, comprising:
    one or more processors;
    a storage; and
    a computer program stored on the storage, wherein, when executed by the one or more processors, the computer program causes the one or more processors to implement a communication mode selection method for a multimode IoT device according to claim 1.

6. A multimode IoT device capable of communication mode selection, comprising:
    a first receiving means, configured to receive a trigger operation for communication mode selection to cause the multimode IoT device to enter a multimode advertising state in response to the trigger operation;
    a sending means, configured to send, in the multimode advertising state, to a network device N network beacon or connection request messages corresponding to communication modes supported by the multimode IoT device, wherein N is an integer greater than or equal to 2;
    a second receiving means, configured to receive a network connection response message from the network device; and
    an executing means, configured to trigger, based on the network connection response message, the multimode IoT device to enter a target communication mode corresponding to the network connection response message,
    wherein the sending means is configured to:
    send the N network beacon or connection request messages corresponding to the communication modes supported by the multimode IoT device sequentially in time via different frequency sets respectively; or
    send at least two of the N network beacon or connection request messages corresponding to the communication modes supported by the multimode IoT device alternately in time via a shared same frequency set.

7. The multimode IoT device according to claim 6, wherein the trigger operation comprises:
    a trigger operation causing the multimode IoT device to be powered on for the first time after leaving factory; or
    a trigger operation causing the multimode IoT device to be powered on for the first time after being reset; or
    a trigger operation causing the multimode IoT device to be connected with the network device for the first time; or
    a trigger operation causing the multimode IoT device to be connected with the network device for the first time after being reset.

8. The multimode IoT device according to claim 6, wherein:
    the communication modes supported by the multimode IoT device comprise a combination of at least two of: Bluetooth Low Energy (BLE) or BLE Mesh, Zigbee, Thread, HomeKit, ANT and a private communicate protocol; and
    the N network beacon or connection request messages corresponding to the communication modes supported by the multimode IoT device comprise a combination of at least two of: a Bluetooth Low Energy advertising message, a Zigbee Beacon request message, a Thread Beacon request message or an MLE discovery request message, and a private beacon.

9. The multimode IoT device according to claim 6, wherein the executing means is configured to trigger a firmware corresponding to the target communication mode among a plurality of firmwares of the multimode IoT device to enter an activated state.

\* \* \* \* \*